United States Patent
Nagumo et al.

(10) Patent No.: US 9,571,145 B2
(45) Date of Patent: Feb. 14, 2017

(54) HIGH FREQUENCY CIRCUIT MODULE

(71) Applicant: Murata Manufacturing Co., Ltd., Nagaokakyo-shi, Kyoto-fu (JP)

(72) Inventors: Shoji Nagumo, Nagaokakyo (JP); Tetsuro Harada, Nagaokakyo (JP); Minoru Iwanaga, Nagaokakyo (JP); Tomohiro Nagai, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/485,857

(22) Filed: Sep. 15, 2014

(65) Prior Publication Data
US 2015/0118984 A1 Apr. 30, 2015

(30) Foreign Application Priority Data
Oct. 25, 2013 (JP) ................................. 2013-221913

(51) Int. Cl.
H04B 1/46 (2006.01)
H04B 1/04 (2006.01)
H04B 1/18 (2006.01)

(52) U.S. Cl.
CPC ............. *H04B 1/18* (2013.01); *H04B 1/0458* (2013.01)

(58) Field of Classification Search
CPC .................................................... H04B 1/0458
USPC ......... 455/120–125, 78, 82, 83, 193.1–193.2
See application file for complete search history.

(56) References Cited

U.S. PATENT DOCUMENTS

| 2004/0130667 | A1 | 7/2004 | Hibino et al. | |
|---|---|---|---|---|
| 2005/0219010 | A1* | 10/2005 | Erb | H04B 1/0458 333/126 |
| 2007/0238423 | A1* | 10/2007 | Kasha | H04B 1/0458 455/121 |
| 2008/0266199 | A1* | 10/2008 | Milosavljevic | H01Q 1/241 343/850 |
| 2009/0045884 | A1* | 2/2009 | Kishimoto | H01P 1/387 333/24.2 |
| 2009/0153431 | A1* | 6/2009 | Ni | H04B 1/18 343/861 |

(Continued)

FOREIGN PATENT DOCUMENTS

| JP | 9-35942 A | 2/1997 |
|---|---|---|
| JP | 2000-13276 A | 1/2000 |

(Continued)

OTHER PUBLICATIONS

Official Communication issued in corresponding Japanese Patent Application No. 2013-221913, mailed on Jul. 28, 2015.

(Continued)

*Primary Examiner* — Simon Nguyen
(74) *Attorney, Agent, or Firm* — Keating & Bennett, LLP (57) ABSTRACT

A high frequency circuit module includes a variable inductance circuit portion and a reactance circuit portion. The variable inductance circuit portion is connected between an antenna port and ground. The variable reactance circuit is connected between the antenna port and a front-end port. The variable inductance circuit portion includes a first inductor, a second inductor, and a switch. The first inductor is connected between the antenna port and the ground. The second inductor and the switch are connected in series, and this series circuit is connected in parallel to the first inductor.

18 Claims, 10 Drawing Sheets

(56) References Cited

U.S. PATENT DOCUMENTS

| | | | |
|---|---|---|---|
| 2009/0167454 A1* | 7/2009 | Kishimoto | H01P 1/36 333/24.1 |
| 2011/0175687 A1* | 7/2011 | Morris, III | H03H 7/383 333/32 |
| 2011/0221543 A1 | 9/2011 | Schmidhammer | |
| 2011/0298685 A1 | 12/2011 | Schmidhammer | |
| 2012/0026063 A1 | 2/2012 | Lee et al. | |
| 2012/0038524 A1 | 2/2012 | Song | |
| 2012/0229347 A1 | 9/2012 | Jin et al. | |
| 2013/0038502 A1* | 2/2013 | Erdem | H03H 7/40 343/861 |
| 2013/0063147 A1* | 3/2013 | Findeklee | G01R 33/365 324/309 |
| 2013/0207739 A1 | 8/2013 | Bakalski | |
| 2013/0207872 A1* | 8/2013 | Bakalski | H04B 1/0458 343/860 |
| 2014/0022132 A1* | 1/2014 | Badaruzzaman | H03H 7/40 343/745 |
| 2014/0028521 A1* | 1/2014 | Bauder | H03H 7/38 343/861 |
| 2014/0104132 A1* | 4/2014 | Bakalski | H03H 7/38 343/861 |
| 2014/0313087 A1* | 10/2014 | Jiang | H01Q 3/22 343/745 |

FOREIGN PATENT DOCUMENTS

| | | |
|---|---|---|
| JP | 2001-217601 A | 8/2001 |
| JP | 2004-172958 A | 6/2004 |
| JP | 2008-35165 A | 2/2008 |
| JP | 2009-253945 A | 10/2009 |
| JP | 2010-226599 A | 10/2010 |
| JP | 2011-130372 A | 6/2011 |
| JP | 2011-171922 A | 9/2011 |
| JP | 2012-515482 A | 7/2012 |
| JP | 2012-186811 A | 9/2012 |
| JP | 2013-26847 A | 2/2013 |
| WO | 2010/040752 A1 | 4/2010 |
| WO | 2010/081635 A1 | 7/2010 |

OTHER PUBLICATIONS

Official Communication issued in corresponding Japanese Patent Application No. 2013-221913, mailed on Dec. 15, 2015.

* cited by examiner

HIGH FREQUENCY CIRCUIT MODULE

BACKGROUND OF THE INVENTION

1. Field of the Invention

The present invention relates to high frequency circuit modules including variable matching circuits configured to perform impedance matching for antennas.

2. Description of the Related Art

Currently, various wireless communication devices are in practical use. These wireless communication devices are typically equipped with high frequency circuit modules that enable communications at a plurality of different kinds of frequency bands. Such a high frequency circuit module that enables communications at a plurality of different kinds of frequency bands includes an antenna capable of transmitting and receiving radio signals across a wide frequency range and a front-end circuit module capable of performing transmission processing and reception processing of communication signals at the plural kinds of frequency bands.

In this high frequency circuit module, it is necessary to have a matching circuit for performing impedance matching between the antenna and the front-end circuit, and the matching circuit is connected between the antenna and the front-end circuit.

Figure 10:
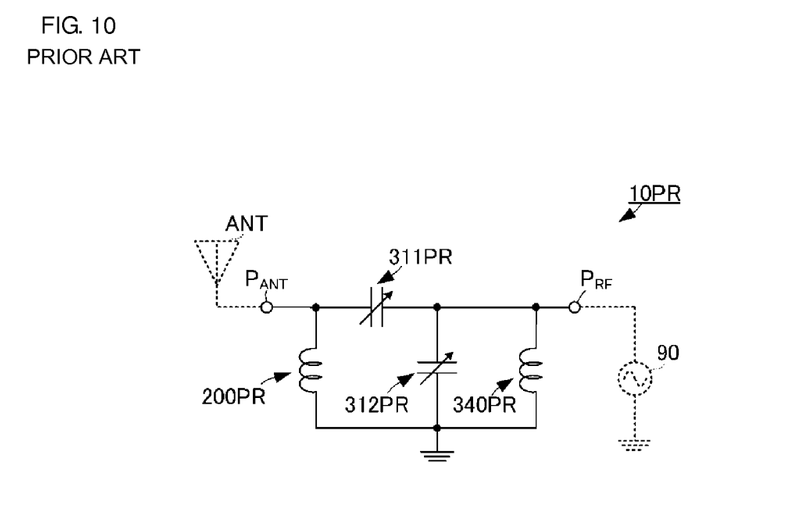
FIG. 10 is a circuit diagram of a variable matching circuit in a related art.

Further, to perform the impedance matching across the wide frequency range as described above, a variable matching circuit such as, for example, the one illustrated in Japanese Unexamined Patent Application Publication No. 2012-515482, may be used. FIG. 10 is a circuit diagram of a variable matching circuit in a related art.

As illustrated in FIG. 10, a high frequency circuit module 10PR including a variable matching circuit described in Japanese Unexamined Patent Application Publication No. 2012-515482 includes an antenna port $P_{ANT}$ for connecting an antenna ANT and a front-end port $P_{RF}$ for connecting a transceiver circuit 90. A variable capacitor 311PR is connected between the antenna port $P_{ANT}$ and the front-end port $P_{RF}$. An inductor 200PR is connected between the antenna port $P_{ANT}$ and ground. A parallel circuit of an inductor 340PR and a variable capacitor 312PR is connected between the front-end port $P_{RF}$ and the ground.

The impedance matching at the plural frequency bands is achieved by varying capacitances of the variable capacitors 311PR and 312PR of this variable matching circuit.

As illustrated in FIG. 10, in many cases in the related art, the variable matching circuits for antenna impedance matching include the inductor between the antenna port $P_{ANT}$ and the ground.

However, such a variable matching circuit including an inductor connected between the antenna port $P_{ANT}$ and the ground as the one described above has a limited adjustable impedance range because of including that inductance.

This poses an issue of higher transmission loss in some of the frequency bands (that prevents accurate impedance matching) when the impedance matching is performed for respective ones of the plural kinds of frequency bands existing across a wide frequency range.

On the other hand, the inductor is an effective device since it facilitates coarse matching between the antenna and the front-end as well as functions as an ESD device.

SUMMARY OF THE INVENTION

Thus, preferred embodiments of the present invention provide a high frequency circuit module including a variable matching circuit that has a configuration in which an inductor is connected between an antenna port and ground and is configured to perform impedance matching with less transmission loss across a wide frequency range.

A high frequency circuit module according to a preferred embodiment of the present invention includes a reactance circuit portion including at least one reactance device and connected between an antenna port to connect an antenna and a front-end port to connect a high frequency front-end circuit, and a variable inductor circuit portion connected between the antenna port and ground.

This configuration provides a wider adjustable range for impedance matching by connecting the variable inductor circuit portion between the antenna port and the ground compared with a case where only a single impedance is available for selection.

Preferably, in the high frequency circuit module according to a preferred embodiment, the variable inductor circuit portion may include a first conductor having a fixed inductance and being connected between the antenna port and the ground, and a second inductor having a fixed inductance and being connected between the antenna port and the ground, a connection of which is to be selected.

This configuration provides a wider adjustable range for impedance matching by enabling discrete selection of the inductance between the antenna port and the ground compared with a case where only single impedance is available for selection. Further, the use of the inductor having a fixed inductance provides a higher Q-value inductor between the antenna port and the ground, making it possible to achieve less loss transmission.

Preferably, the high frequency circuit module according to a preferred embodiment may further include a switch configured to select the connection of the second inductor between the antenna port and the ground, and this switch and the second inductor may be connected in series between the antenna port and the ground.

Preferably, the high frequency circuit module according to a preferred embodiment may include a plurality of series circuits of the second inductor and the switch.

Further, the high frequency circuit module according to a preferred embodiment may further include a switch configured to select the connection of the second inductor between the antenna port and the ground, and a parallel circuit of the second inductor and the switch may be connected in series to the first conductor.

Preferably, the high frequency circuit module according to a preferred embodiment may include a plurality of parallel circuits of the second inductor and the switch.

Further, in the high frequency circuit module according to a preferred embodiment, the plurality of the parallel circuits may include a parallel circuit of a first pair of the second inductor and the switch and a parallel circuit of a second pair of the second inductor and the switch, and is configured so that a series circuit of the parallel circuit of the first pair and the second inductor of the second pair is connected in parallel to the switch of the second pair.

The foregoing configurations describe aspects of specific circuit configurations of the variable inductor circuit portion according to various preferred embodiments of the present invention. These circuit configurations make it possible to achieve impedance matching across a wide range. In particular, a wider variety of impedance matching is achieved by including plural pairs of the second inductor and the switch, for example.

Preferably, the high frequency circuit module according to a preferred embodiment may have the following configuration. The reactance circuit portion includes at least three reactance devices. A first reactance device is connected between the antenna port and the front-end port. A second reactance device is connected between the ground and the first reactance device at an antenna port side thereof. A third reactance device is connected between the ground and the first reactance device at a front-end port side thereof.

The foregoing configuration describes an aspect of specific circuit configuration of the reactance circuit portion according to a preferred embodiment of the present invention. Having this circuit configuration extends an achievable impedance range.

Preferably, in the high frequency circuit module according to a preferred embodiment of the present invention, at least one of the first reactance device, the second reactance device, and the third reactance device may be a variable reactance device.

This configuration ensures achievement of desired impedance and extension of impedance matching range.

Further, the high frequency circuit module according to a preferred embodiment of the present invention may have the following configuration. The reactance circuit portion, the first inductor, and the switch may be formed or mounted on a circuit substrate in advance. Further, a mounting land for the second inductor may be provided on the circuit substrate, and the second inductor may be mounted on that mounting land. Alternatively, the high frequency circuit module may be configured so that the circuit substrate is provided with a connecting port for the second inductor and that connecting port is connected to the second inductor mounted on a mainboard on which the module is mounted.

In this configuration, the second inductor is a mounting type inductor. Thus, the achievable impedance range is extended by selecting the inductance of the second inductor to be mounted. Further, the mounting type inductor may have a high Q-value compared with an inductor provided inside the substrate. Thus, the high frequency circuit module with less loss is achieved.

Further, the high frequency circuit module according to a preferred embodiment may have the following configuration. The high frequency circuit module may further include an antenna that is connected to the antenna port. The antenna preferably includes an antenna conductor pattern provided on an insulating substrate. Preferably, the first inductor or the second inductor preferably include a line conductor pattern provided on the insulating substrate and electrically connected to the antenna conductor pattern.

This configuration makes it possible to provide the antenna and the first inductor or the second inductor on a single insulating substrate. Further, desired impedance is more accurately achieved since the first inductor or the second inductor is directly connected near a feed port of the antenna.

Preferred embodiments of the present invention make is possible to perform impedance matching across a wide frequency range and transmit high frequency communication signals with less loss across the wide frequency range between an antenna and a front-end circuit.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
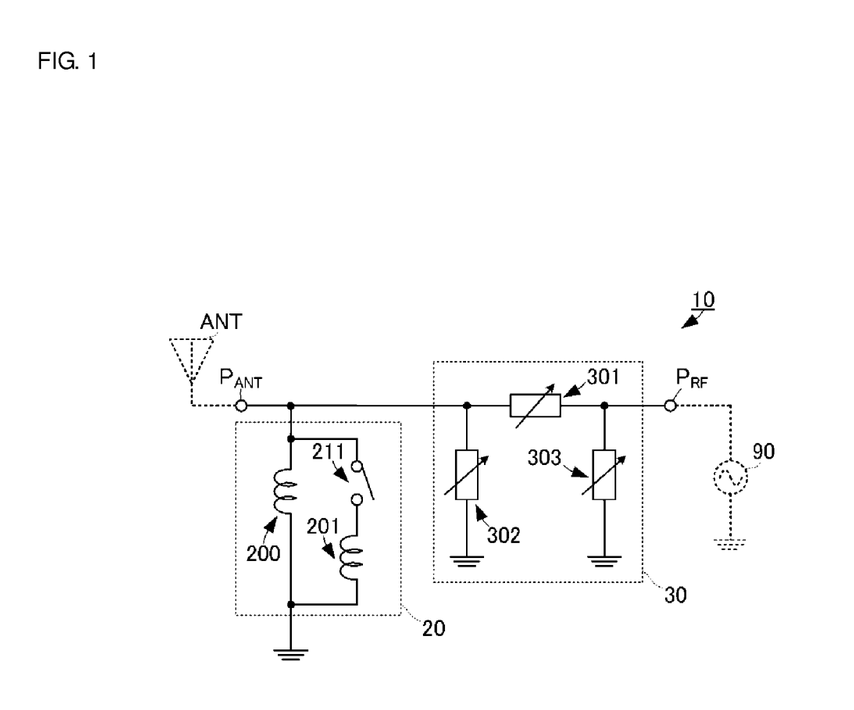
FIG. 1 is a circuit diagram of a high frequency circuit module according to a first preferred embodiment of the present invention.
Figure 2A:
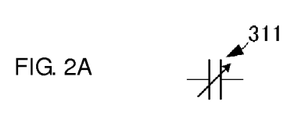
FIGS. 2A to 2F are diagrams illustrating exemplary circuit configurations of a reactance device in a variable reactance circuit portion according to the first preferred embodiment of the present invention.
Figure 2B:
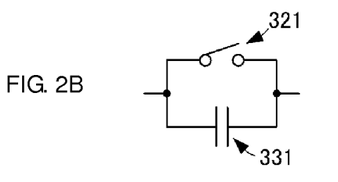
Figure 2C:
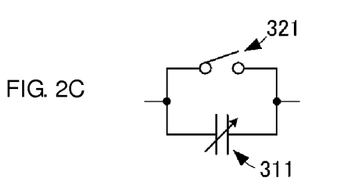
Figure 2D:
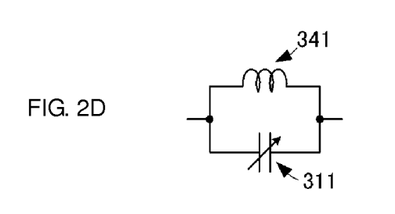
Figure 2E:
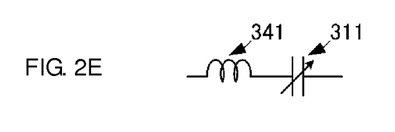
Figure 2F:
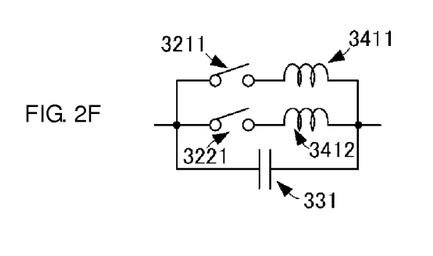

A high frequency circuit module according to a first preferred embodiment of the present invention is described with reference to the drawings. FIG. 1 is a circuit diagram of the high frequency circuit module according to the first preferred embodiment of the present invention.

A high frequency circuit module 10 includes a variable inductance circuit portion 20 and a reactance circuit portion 30.

An antenna port $P_{ANT}$ of the high frequency circuit module 10 is a port to connect an antenna ANT. A front-end port $P_{RF}$ is a port to connect a transceiver circuit (front-end circuit) 90.

The variable inductance circuit portion 20 is connected between the antenna port $P_{ANT}$ and ground. The variable inductance circuit portion 20 includes an inductor 200, an inductor 201, and a switch 211. The inductor 200 corresponds to a first inductor in preferred embodiments of the present invention, and the inductor 201 corresponds to a second inductor in preferred embodiments of the present invention. The inductor 200 is connected between the antenna port $P_{ANT}$ and the ground. The inductor 201 and the switch 211 are connected in series, and this series circuit is connected in parallel to the inductor 200. In other words, the series circuit of the inductor 201 and the switch 211 is also connected between the antenna port $P_{ANT}$ and the ground. The inductors 200 and 201 are devices that have fixed inductances.

This circuit configuration allows the variable inductance circuit portion 20 to define the circuit configuration where only the inductor 200 is connected between the antenna port $P_{ANT}$ and the ground when the switch 211 is controlled to be open. When the switch 211 is controlled so as to provide electrical continuity, the variable inductance circuit portion 20 defines the circuit configuration where the inductors 200 and 201 are connected in parallel between the antenna port $P_{ANT}$ and the ground.

The variable reactance circuit 30 is connected between the antenna port $P_{ANT}$ and the front-end port $P_{RF}$. The variable reactance circuit 30 includes reactance devices 301, 302, and 303. The reactance device 301 is connected in series between the antenna port $P_{ANT}$ and the front-end port $P_{RF}$. The reactance device 302 is connected between the ground and an antenna port $P_{ANT}$ side end portion of the reactance device 301. The reactance device 303 is connected between the ground and a front-end port $P_{RF}$ side end portion of the reactance device 301.

The reactance devices 301, 302, and 303 each preferably include a variable reactance device. It is preferable that at least one of the reactance devices 301, 302, and 303 is a variable reactance device. Some of the reactance devices 301, 302, and 303 may be omitted from the configuration as long as at least one variable reactance device is provided between the antenna port $P_{ANT}$ and the front-end port $P_{RF}$. Note that a larger number of the variable reactance devices extends an achievable impedance range and accurately achieves a desired impedance.

FIGS. 2A to 2F are diagrams illustrating exemplary circuit configurations of a reactance device in a variable reactance circuit portion according to the first preferred embodiment of the present invention. A reactance device illustrated in FIG. 2A preferably includes a variable capacitor 311. A reactance device illustrated in FIG. 2B preferably includes a parallel circuit of a fixed switch 321 and a capacitor 331. A reactance device illustrated in FIG. 2C preferably includes a parallel circuit of the variable capacitor 311 and the switch 321. A reactance device illustrated in FIG. 2D preferably includes a parallel circuit of the variable capacitor 311 and an inductor 341. A reactance device illustrated in FIG. 2E preferably includes a series circuit of the variable capacitor 311 and the inductor 341. A reactance device illustrated in FIG. 2F preferably includes a circuit in which a series circuit of an inductor 3411 and a switch 3211, a series circuit of an inductor 3412 and a switch 3221, and the fixed capacitor 331 are connected in parallel. The reactance devices 301, 302, and 303 are not limited to those circuits illustrated in FIGS. 2A to 2F, and any other circuit configuration may be used as long as its reactance is variable as a device.

With the foregoing circuit configuration, the high frequency circuit module 10 of the present preferred embodiment selects the inductance of the variable inductance circuit portion 20 and adjusts the reactance of the variable reactance circuit 30 at each frequency, thus performing impedance matching between a transceiver circuit 90 connected to the front-end port $P_{RF}$ and the antenna ANT connected to the antenna port $P_{ANT}$ in a desired frequency range. Specifically, the impedance matching may be performed at each one of plural frequency bands across a wide frequency range of about 700 MHz to about 2.7 GHz, for example.

Figure 3:
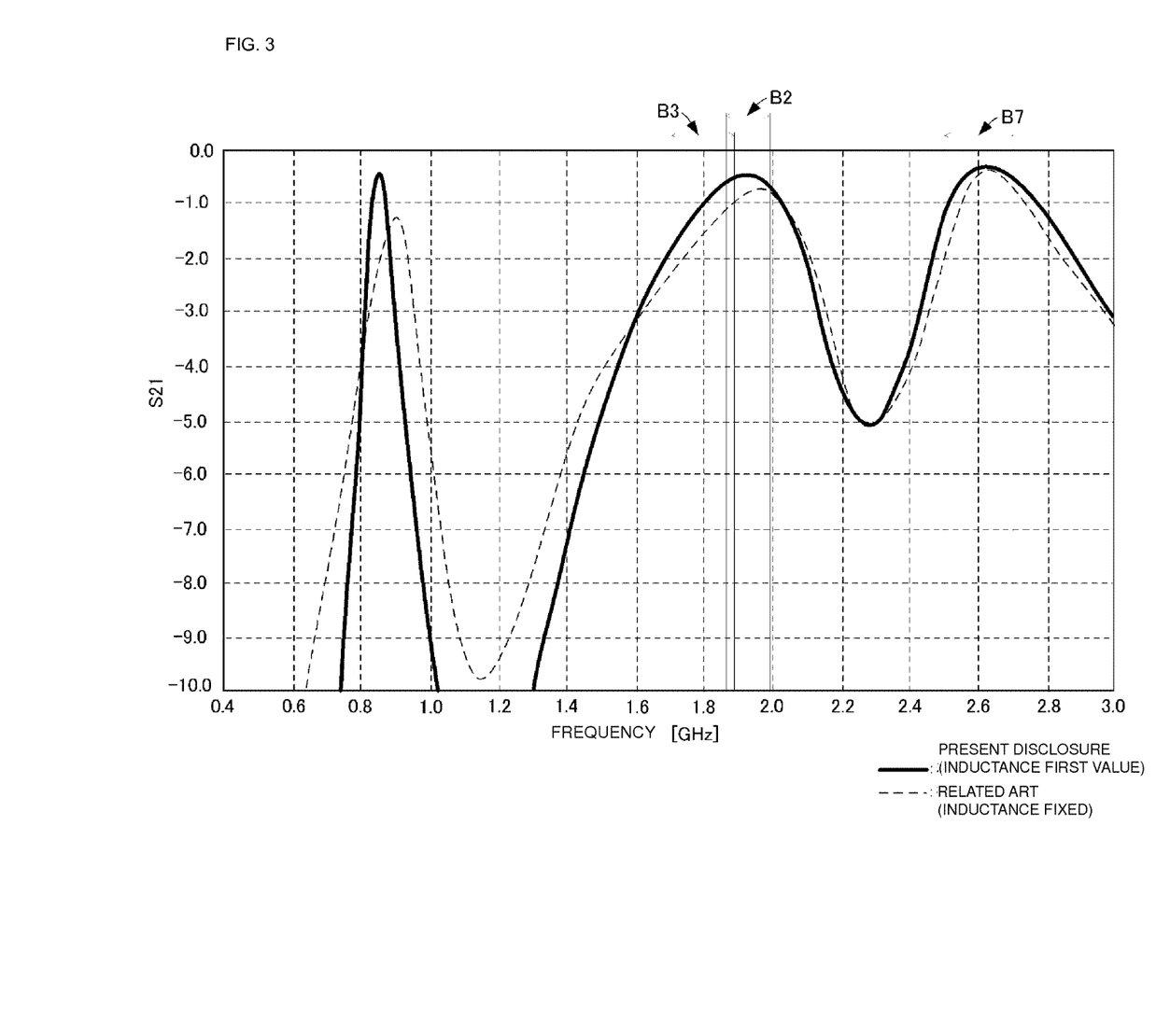
FIG. 3 is a diagram illustrating a transmission characteristic between an antenna port $P_{ANT}$ and a front-end port $P_{RF}$ when a variable matching circuit according to the first preferred embodiment of the present invention is used.
Figure 4:
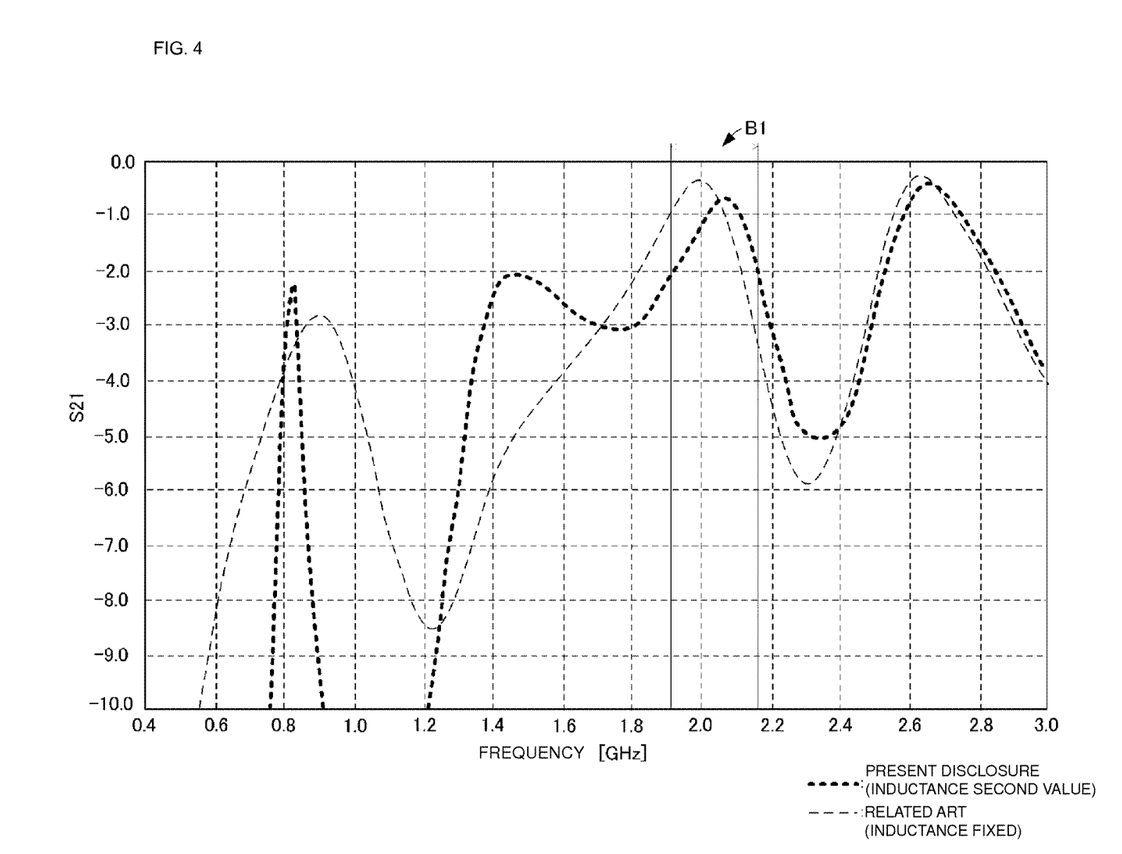
FIG. 4 is a diagram illustrating a transmission characteristic between an antenna port $P_{ANT}$ and a front-end port $P_{RF}$ when a variable matching circuit according to the first preferred embodiment of the present invention is used.

FIG. 3 and FIG. 4 are diagrams illustrating transmission characteristics between the antenna port $P_{ANT}$ and the front-end port $P_{RF}$ when a variable matching circuit according to the first preferred embodiment of the present invention is used. In FIG. 3 and FIG. 4, the horizontal axis represents the frequency, and the vertical axis represents the S21 characteristic in dB. Further, a bold solid line and a bold dotted line are characteristic curves of the high frequency circuit module 10 according to the present preferred embodiment, and dashed lines are characteristic curves of a high frequency circuit module (corresponds to a high frequency circuit module of a related art) that serves as a comparison example. The inductance of the inductor connected between the antenna port $P_{ANT}$ and the ground is switched between the bold solid line and the bold dotted line. In the comparison example, the inductor connected between the antenna port $P_{ANT}$ and the ground has a fixed value. Further, in FIG. 3, B3 designates a communication frequency band of Band 3 (1.71 GHz to 1.88 GHz), B2 designates a communication frequency band of Band 2 (1.85 GHz to 1.99 GHz), and B7 designates a communication frequency band of Band 7 (2.50 GHz to 2.69 GHz). In FIG. 4, B1 designates a communication frequency band of Band 1 (1.92 GHz to 2.17 GHz).

As illustrated in FIG. 3, having the configuration of the present preferred embodiment improves the transmission characteristic at desired frequency bands Band 2, Band 3, and Band 7 compared with the configuration of related art.

Specifically, the following characteristics may be obtained for each frequency band.

For Band 3, the inductance is set to a first value that is switched whereas the inductance is set to a fixed value in the comparison example. Thus, the bold solid line and the dashed line of FIG. 3 are now compared. As illustrated by the bold solid line and the dashed line of FIG. 3, in the communication frequency band B3 of Band 3, the high frequency circuit module 10 of the present preferred embodiment has a lower loss than the high frequency circuit module of the comparison example, and the loss is contained less than about 2 dB throughout the whole frequency band. Thus, high frequency signals in Band 3 is transmitted with less loss.

For Band 2, as is the case with Band 3, the inductance is set to the first value. Thus, the bold solid line and the dashed line of FIG. 3 are now compared. As illustrated by the bold solid line and the dashed line of FIG. 3, in the communication frequency band B2 of Band 2, the high frequency circuit module 10 of the present preferred embodiment has a lower loss than the high frequency circuit module of the comparison example, and the loss is contained less than about 1 dB throughout the whole frequency band. Thus, high frequency signals in Band 2 is transmitted with less loss.

For Band 7, as is the case with Band 3, the inductance is set to the first value. Thus, the bold solid line and the dashed line of FIG. 3 are now compared. As illustrated by the bold solid line and the dashed line of FIG. 3, in the communication frequency band B3 of Band 3, the high frequency circuit module 10 of the present preferred embodiment has a lower loss than the high frequency circuit module of the comparison example, and the loss is contained equal to or less than about 1 dB throughout the whole frequency band. Thus, high frequency signals in Band 7 is transmitted with less loss.

Further, as illustrated in FIG. 4, the configuration of the present preferred embodiment allows the transmission characteristic to be improved in the desired frequency band, Band 1, compared with the configuration of related art.

For Band 1, the inductance is set to a second value that is switched whereas the inductance is set to a fixed value in the comparison example. Thus, the bold dotted line and the dashed line of FIG. 4 are now compared. As illustrated by the bold dotted line and the dashed line of FIG. 4, in the communication frequency band B1 of Band 1, the high frequency circuit module 10 of the present preferred embodiment has a higher loss at a low-end frequency than the high frequency circuit module of the comparison example. However, the loss is about 2.0 dB and still low. Further, at a high-end frequency, using the high frequency circuit module 10 of the present preferred embodiment enables to reduce the loss compared with the comparison example. Specifically, the loss that is larger than about 3.0 dB in the comparison example may be reduced to about 2.0 dB. Further, in the communication frequency band B1, the loss reaches maxima at the high-end frequency and the low-end frequency. Thus, in the communication frequency band B1 of Band 1, the loss is suppressed so as to be equal to or less than about 2.0 dB over the whole frequency range.

As described above, the use of the high frequency circuit module 10 of the present preferred embodiment remedies the loss in the frequency bands B1, B2, B3, and B7 and achieves less loss.

Further, in the high frequency circuit module 10 of the present preferred embodiment, the variable inductance circuit portion 20 preferably includes the inductors that have fixed inductances. Thus, each inductor preferably has a high Q-value. This remedies the loss and achieves the transmission characteristic with lesser loss.

Note that the foregoing combinations of frequency bands and the foregoing combinations of frequency bands to be improved are exemplary, non-limiting applications of the high frequency circuit module 10 of the present preferred embodiment. When other combinations of frequency bands are used, the inductances and capacitances of the variable inductance circuit portion 20 and the variable reactance circuit portion 30 may be arbitrary adjusted, thus achieving the transmission characteristic with less loss across a similar wide frequency range.

Figure 5:
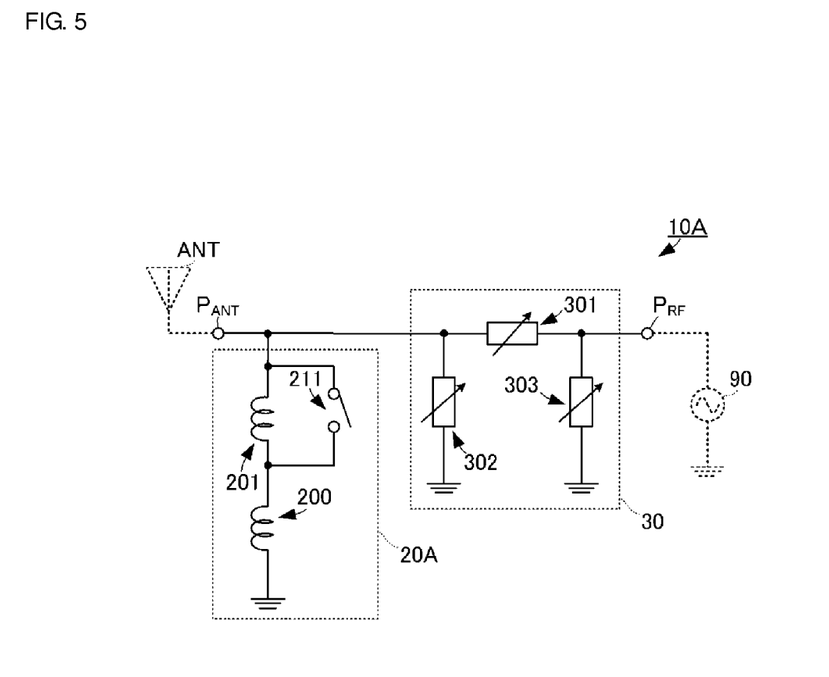
FIG. 5 is a circuit diagram of a high frequency circuit module according to a second preferred embodiment of the present invention.

Next, a high frequency circuit module according to a second preferred embodiment of the present invention is described with reference to the drawings. FIG. 5 is a circuit diagram of the high frequency circuit module according to the second preferred embodiment of the present invention. A high frequency circuit module 10A of the present preferred embodiment differs from the high frequency circuit module 10 according to the first preferred embodiment in the configuration of a variable inductance circuit portion 20A. The remaining configuration of the high frequency circuit module 10A of the present preferred embodiment is preferably the same as that of the high frequency circuit module 10 according to the first preferred embodiment. Thus, only sections differ from the high frequency circuit module 10 according to the first preferred embodiment are described in detail.

The variable inductance circuit portion 20A includes an inductor 200, an inductor 201, and a switch 211. The inductor 200 corresponds to the first inductor in preferred embodiments of the present invention, and the inductor 201 corresponds to the second inductor in preferred embodiments of the present invention.

The inductor 200 is connected between an antenna port $P_{ANT}$ and ground. The inductor 201 and the switch 211 are connected in parallel, and this parallel circuit is connected to the antenna port $P_{ANT}$ and the inductor 200. In other words, a series circuit of the inductor 200 and the parallel circuit of the inductor 201 and the switch 211 is connected between the antenna port $P_{ANT}$ and ground. The inductors 200 and 201 are devices that have fixed inductances.

This circuit configuration allows the variable inductance circuit portion 20A to define the circuit configuration where a series circuit of the inductors 200 and 201 is connected between the antenna port $P_{ANT}$ and the ground when the switch 211 is controlled to be open. When the switch 211 is controlled so as to provide electrical continuity, the variable inductance circuit portion 20A defines the circuit configuration where only the inductor 200 is connected between the antenna port $P_{ANT}$ and the ground.

Even with this circuit configuration, functions and effects similar to those in the first preferred embodiment are obtained.

Figure 6:
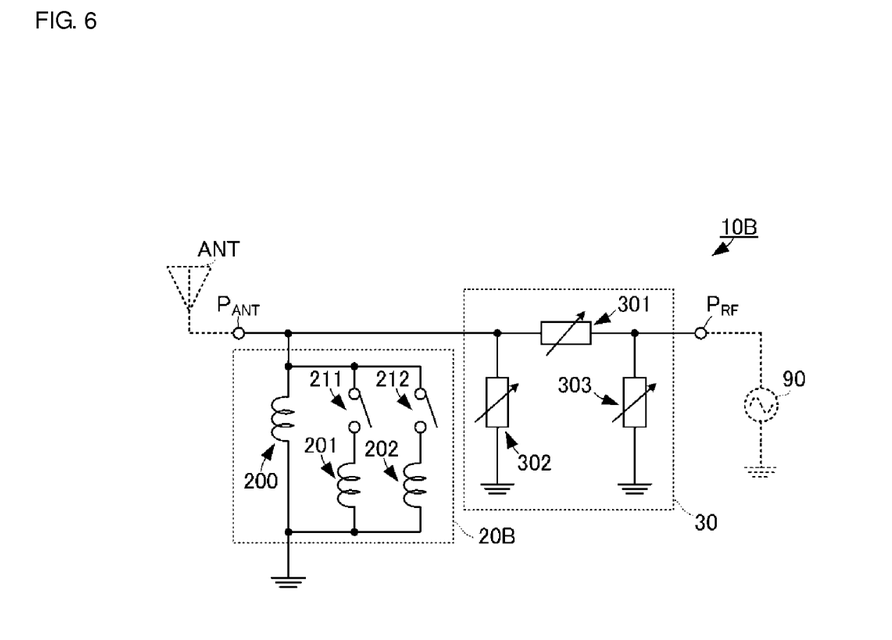
FIG. 6 is a circuit diagram of a high frequency circuit module according to a third preferred embodiment of the present invention.

Next, a high frequency circuit module according to a third preferred embodiment of the present invention is described with reference to the drawings. FIG. 6 is a circuit diagram of the high frequency circuit module according to the third preferred embodiment of the present invention. A high frequency circuit module 10B of the present preferred embodiment differs from the high frequency circuit module 10 according to the first preferred embodiment in the configuration of a variable inductance circuit portion 20B. The remaining configuration of the high frequency circuit module 10B of the present preferred embodiment is preferably the same as that of the high frequency circuit module 10 according to the first preferred embodiment. Thus, only sections differ from the high frequency circuit module 10 according to the first preferred embodiment are described in detail.

The variable inductance circuit portion 20B includes an inductor 200, an inductor 201, an inductor 202, a switch 211, and a switch 212. The inductor 200 corresponds to the first inductor in preferred embodiments of the present invention, and the inductors 201 and 202 correspond to the second inductors in preferred embodiments of the present invention.

The inductor 200 is connected between an antenna port $P_{ANT}$ and ground. The inductor 201 and the switch 211 are connected in series, and this first series circuit is connected in parallel to the inductor 200. In other words, the series circuit of the inductor 201 and the switch 211 is also connected between the antenna port $P_{ANT}$ and the ground. The inductor 202 and the switch 212 are connected in series, and the second series circuit is connected in parallel to the inductor 200. In other words, the series circuit of the inductor 202 and the switch 212 is also connected between the antenna port $P_{ANT}$ and the ground. The inductors 200, 201, and 202 are devices that have fixed inductances.

This configuration allows the variable inductance circuit portion 20B to achieve a plurality of different kinds of inductance by controlling open/continuity of the switches 211 and 212. Accordingly, functions and effects similar to those in the first preferred embodiment are obtained even with the circuit configuration of the present preferred embodiment.

Further, in the high frequency circuit module 10B of the present preferred embodiment, the number of different inductances that can be achieved with the variable inductance circuit portion 20B increases. Thus, a desired impedance matching characteristic (transmission characteristic) is more reliably achieved. Further, selecting the inductance achieves impedance matching across a wider frequency range.

Figure 7:
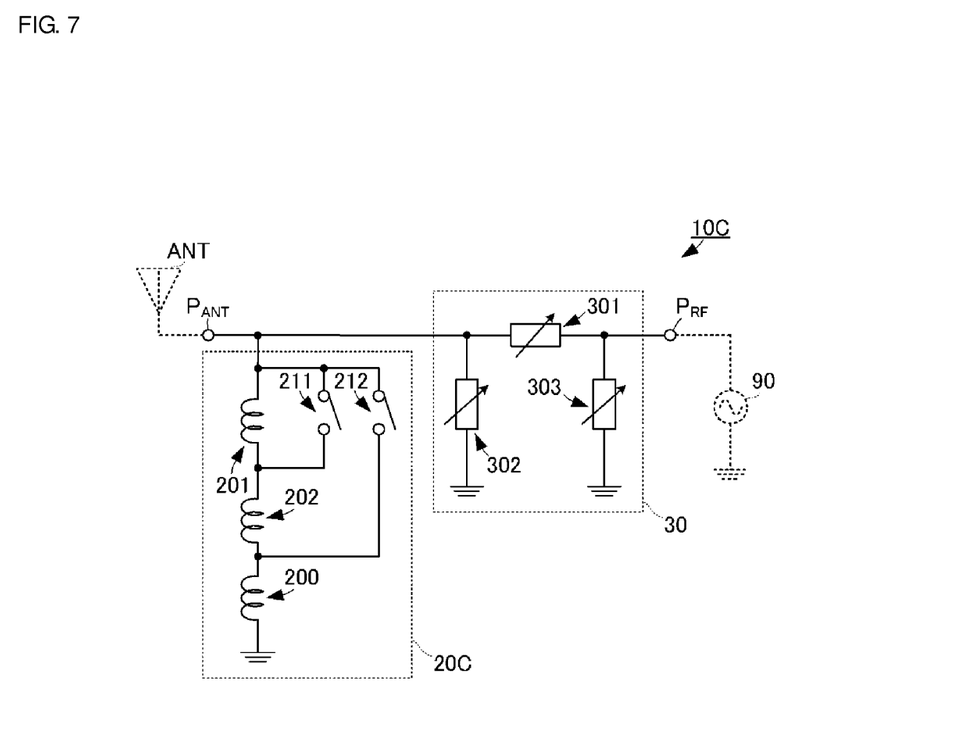
FIG. 7 is a circuit diagram of a high frequency circuit module according to a fourth preferred embodiment of the present invention.

Next, a high frequency circuit module according to a fourth preferred embodiment of the present invention is described with reference to the drawings. FIG. 7 is a circuit diagram of the high frequency circuit module according to the fourth preferred embodiment of the present invention. A high frequency circuit module 10C of the present preferred embodiment differs from the high frequency circuit module 10 according to the first preferred embodiment in the configuration of a variable inductance circuit portion 20C. The remaining configuration of the high frequency circuit module 10C of the present preferred embodiment preferably is the same as that of the high frequency circuit module 10 according to the first preferred embodiment. Thus, only sections differ from the high frequency circuit module 10 according to the first preferred embodiment are described in detail.

The variable inductance circuit portion 20C includes an inductor 200, an inductor 201, an inductor 202, a switch 211, and a switch 212. The inductor 200 corresponds to the first inductor in preferred embodiments of the present invention, and the inductors 201 and 202 correspond to the second inductors in preferred embodiments of the present invention.

The inductor 200 is connected between an antenna port $P_{ANT}$ and ground. The inductor 201 and the switch 211 are connected in parallel, and this first parallel circuit is connected to the antenna port $P_{ANT}$ and the inductor 200. A pair of the inductor 201 and the switch 211 corresponds to a first pair in preferred embodiments of the present invention.

The inductor 202 is connected between the first parallel circuit and the inductor 200. The switch 212 is connected in parallel to a series circuit of the first parallel circuit and the inductor 202. A pair of the inductor 202 and the switch 212 corresponds to a second pair in preferred embodiments of the present invention.

The inductors 200, 201, and 202 are devices that have fixed inductances.

As is the case with the variable inductance circuit portion 20B of the third preferred embodiment, this configuration also allows the variable inductance circuit portion 20C to achieve plural kinds of inductance by controlling open/continuity of the switches 211 and 212. Accordingly, functions and effects similar to those in the first preferred embodiment are obtained even with the circuit configuration of the present preferred embodiment.

Further, in the high frequency circuit module 10C of the present preferred embodiment, the number of different inductances that can be achieved with the variable inductance circuit portion 20C increases, as is the case with the high frequency circuit module 10B of the third preferred embodiment. Thus, a desired impedance matching characteristic (transmission characteristic) is more reliably achieved. Further, selecting the inductance achieves impedance matching across a wider frequency range.

In the foregoing variable inductance circuit portions 20B and 20C according to the third and fourth preferred embodiments, examples are described as preferably including two pairs of the second inductor and the switch. However, the configuration may further include a third pair or more of the second inductor and the switch, for example. Increasing the number of pairs achieves a desired impedance matching characteristic (transmission characteristic) more reliably and achieve impedance matching across a wider frequency range.

Figure 8A:
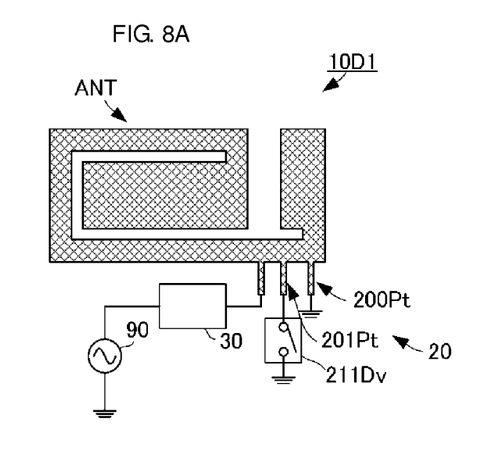
FIGS. 8A and 8B are configuration diagrams of a high frequency circuit module according to a fifth preferred embodiment of the present invention.
Figure 8B:
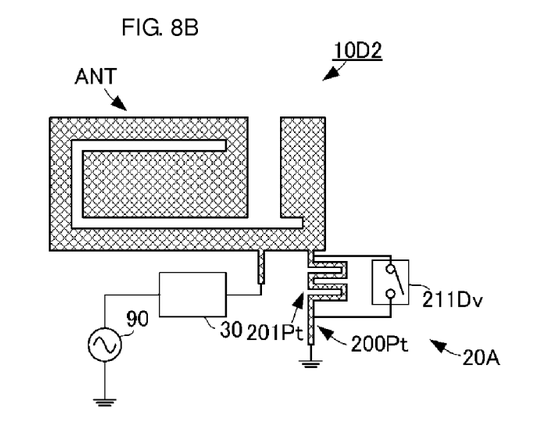

Next, high frequency circuit modules according to a fifth preferred embodiment are described with reference to the drawings. FIGS. 8A and 8B are configuration diagrams of the high frequency circuit modules according to the fifth preferred embodiment of the present invention. FIG. 8A is a configuration diagram of a high frequency circuit module 10D1 that serves as an example that structurally achieves the high frequency circuit module 10 of the first preferred embodiment. FIG. 8B is a configuration diagram of a high frequency circuit module 10D2 that serves as an example that structurally achieves the high frequency circuit module 10A of the second preferred embodiment.

As illustrated in FIG. 8A, the high frequency circuit module 10D1 according to the present preferred embodiment includes an antenna ANT in addition to the circuit configuration of the high frequency circuit module 10 described in the first preferred embodiment. The antenna ANT preferably includes a conductor pattern provided on an insulating substrate. A pattern shape may be determined arbitrarily based on a frequency range of high frequency signals to be transmitted and received, for example, an inverted-F antenna pattern as shown in FIGS. 8A and 8B. A line conductor pattern 200Pt that defines the inductor 200 and a line conductor pattern 201Pt that defines the inductor 201 are connected near a feed port of the conductor pattern defining the antenna ANT. These conductor patterns 200Pt and 201Pt may, for example, provided on an insulating substrate on which the conductor pattern of the antenna ANT is provided.

The conductor pattern 200Pt is connected to ground at an end portion opposite to a connection point with the antenna ANT. The conductor pattern 201Pt is connected to the ground via a switch device 211Dv at an end portion opposite to a connection point with the antenna ANT.

An additional lead conductor pattern is connected near a feed port portion of the antenna port $P_{ANT}$. This lead conductor pattern connects the antenna port $P_{ANT}$ and a circuit block that defines the variable reactance circuit portion 30.

The conductor pattern defining the antenna ANT, the conductor patterns 200Pt and 201Pt, and the lead conductor pattern are preferably configured as a single integral unit.

The circuit block defining the variable reactance circuit 30 is connected to a circuit block that configures the transceiver circuit 90.

The circuit block defining the variable reactance circuit 30 and the circuit block configuring the transceiver circuit 90 may be formed or mounted on the insulating substrate on which the conductor pattern of the antenna ANT is provided, or formed or mounted on an insulating substrate different from the insulating substrate on which the conductor pattern of the antenna ANT is provided and connected to the insulating substrate on which the conductor pattern of the antenna ANT is provided.

This configuration achieves substantially the same circuit as the high frequency circuit module 10 according to the first preferred embodiment and obtains substantially the same functions and effects as the high frequency circuit module 10 according to the first preferred embodiment.

As illustrated in FIG. 8B, the high frequency circuit module 10D2 according to the present preferred embodiment includes an antenna ANT in addition to the circuit configuration of the high frequency circuit module 10A described in the second preferred embodiment. The antenna ANT preferably includes a conductor pattern provided on an insulating substrate. A pattern shape may be determined arbitrary based on a frequency range of high frequency signals to be transmitted and received. A line conductor pattern 201Pt that defines the inductor 201 is connected near the feed port of the conductor pattern defining the antenna ANT. The conductor pattern 201 may have, for example, a meander shape. A line conductor pattern 200Pt that defines the inductor 200 is connected to the conductor pattern 201Pt at an end portion opposite to a feed port portion thereof. The conductor pattern 200Pt is connected to the ground at an end portion opposite to the conductor pattern 201Pt. These conductor patterns 201Pt and 200Pt may, for example, be provided on an insulating substrate on which the conductor pattern of the antenna ANT is located.

The conductor pattern 200Pt is connected to ground at an end portion opposite to a connection point with the antenna ANT. Further, a switch device 211Dv is connected in parallel to the conductor pattern 200Pt.

An additional lead conductor pattern is connected near the feed port portion of the antenna port $P_{ANT}$. This lead conductor pattern connects the antenna port $P_{ANT}$ and a circuit block that defines the variable reactance circuit portion 30.

The conductor pattern defining the antenna ANT, the conductor pattern 200Pt, and the lead conductor pattern are preferably configured as a single integral unit.

The circuit block defining the variable reactance circuit 30 is connected to a circuit block that configures the transceiver circuit 90.

The circuit block defining the variable reactance circuit 30 and the circuit block configuring the transceiver circuit 90 may be formed or mounted on the insulating substrate on which the conductor pattern of the antenna ANT is provided, or formed or mounted on an insulating substrate different from the insulating substrate on which the conductor pattern of the antenna ANT is provided and connected to the insulating substrate on which the conductor pattern of the antenna ANT is provided.

This configuration achieves substantially the same circuit as the high frequency circuit module 10A according to the second preferred embodiment and obtains substantially the same functions and effects as the high frequency circuit module 10A according to the second preferred embodiment.

Further, using the configurations of the present preferred embodiment makes it possible to determine accurately the lengths of the conductor patterns from the feed port portion of antenna. Thus, settings of the inductances of the inductors 200 and 201 are capable of being performed with high accuracy. This achieves a desired impedance matching characteristic more accurately.

Figure 9A:
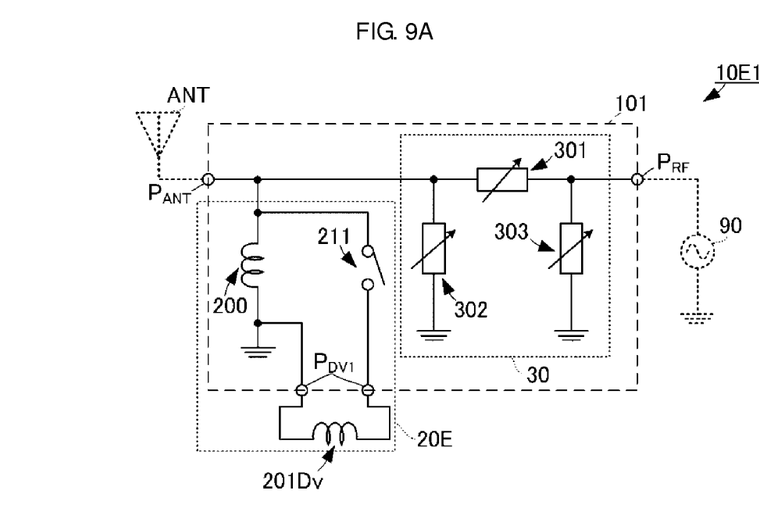
FIGS. 9A and 9B are configuration diagrams of a high frequency circuit module according to a sixth preferred embodiment of the present invention.
Figure 9B:
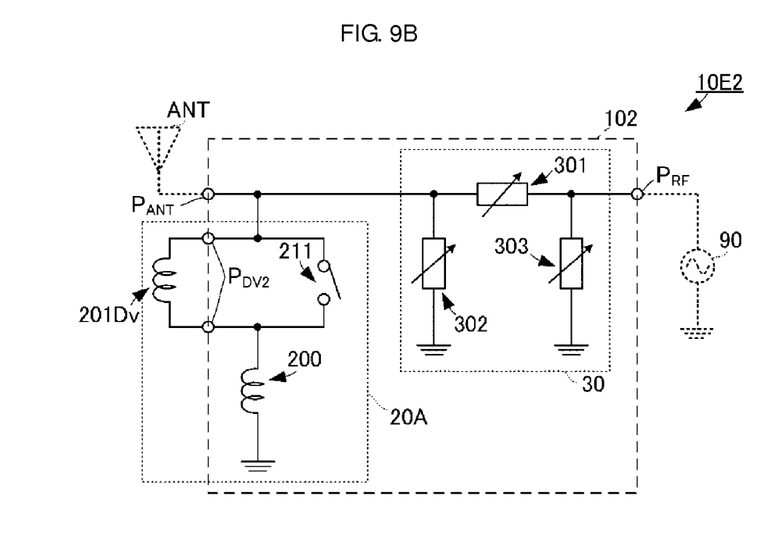

Next, high frequency circuit modules according to a sixth preferred embodiment of the present invention are described with reference to the drawings. FIGS. 9A and 9B are configuration diagrams of the high frequency circuit modules according to the sixth preferred embodiment of the present invention. FIG. 9A is a configuration diagram of a high frequency circuit module 10E1 that serves as an example that structurally achieves the high frequency circuit module 10 of the first preferred embodiment. FIG. 9B is a configuration diagram of a high frequency circuit module 10E2 that serves as an example that structurally achieves the high frequency circuit module 10A of the second preferred embodiment.

As illustrated in FIG. 9A, the high frequency circuit module 10E1 according to the present preferred embodiment is preferably configured as a single circuit module 101 except for a mounting type inductor device 201Dv that defines an inductor 201.

The circuit module 101 includes an antenna port $P_{ANT}$, a front-end port $P_{RF}$, and mounting ports $P_{DV1}$. Circuit elements of the high frequency circuit module 10 except for the inductor 201 may be defined by, for example, a multilayer body and conductor patterns provided thereon or mounting-type circuit devices.

The mounting-type inductor device 201Dv is mounted at the mounting ports $P_{DV1}$. This achieves substantially the same circuit as the high frequency circuit module 10 according to the first preferred embodiment and obtains substantially the same functions and effects as the high frequency circuit module 10 according to the first preferred embodiment.

As illustrated in FIG. 9B, the high frequency circuit module 10E2 according to the present preferred embodiment is preferably configured as a single circuit module 102 except for a mounting type inductor device 201Dv that defines the inductor 201. The circuit module 102 includes an antenna port $P_{ANT}$, a front-end port $P_{RF}$, and mounting ports $P_{DV2}$. Circuit elements of the high frequency circuit module 10A except for the inductor 201 may be defined with, for example, a multilayer body and conductor patterns provided thereon or mounting-type circuit devices.

The mounting-type inductor device 201Dv is mounted at the mounting ports $P_{DV2}$. This achieves substantially the same circuit as the high frequency circuit module 10A according to the second preferred embodiment and obtains substantially the same functions and effects as the high frequency circuit module 10A according to the second preferred embodiment.

Further, using the configurations of the present preferred embodiment makes it possible to adjust the inductance of the inductor 201 by selecting the inductor device to be mounted. This achieves a desired impedance matching characteristic more accurately and facilitates impedance matching across a wider frequency range.

In the foregoing preferred embodiments, the variable inductance circuit portion achieves plural discrete inductances preferably by combining a fixed-value inductor and a switch. However, other configurations may be alternatively used to obtain the functions and effects of the foregoing preferred embodiments by using configurations that change the inductance discretely or continuously.

Other Preferred Embodiments

Modifications within the scope of the present invention may be made not only in the high frequency circuit module 10 but also in high frequency circuit modules according to preferred embodiments of the present invention.

In preferred embodiments of the present invention, the antenna port $P_{ANT}$ and the front-end port $P_{RF}$ may not always be connected to the antenna or the transceiver circuit, and may alternatively be connected between circuits on which impedance matching is performed.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A high frequency circuit module comprising:
an insulating substrate;
an antenna;
an antenna port connected to the antenna;
a front-end port connected to a high frequency front-end circuit;
a reactance circuit portion including at least one variable reactance device, the at least one variable reactance device being a variable capacitance element connected in series between the antenna port and the front-end port; and
a variable inductor circuit portion including an inductor and a switch, the variable inductor circuit portion being connected between the antenna port and ground; wherein
the inductor is a first inductor having a fixed inductance and is connected between the antenna port and the ground;
the variable inductor circuit portion further includes a second inductor having a fixed inductance and being connected between the antenna port and the ground;

the antenna includes an antenna conductor pattern provided on the insulating substrate;
the first inductor or the second inductor includes a line conductor pattern provided on the insulating substrate and connected to the antenna conductor pattern; and
the antenna is an inverted-F antenna.

2. The high frequency circuit module according to claim 1, wherein
the switch is configured to select the connection of the second inductor between the antenna port and the ground; and
the second inductor and the switch are connected in series between the antenna port and the ground.

3. The high frequency circuit module according to claim 2, further comprising a plurality of series circuits of the second inductor and the switch.

4. The high frequency circuit module according to claim 3, wherein
the antenna includes an antenna conductor pattern provided on an insulating substrate; and
at least one of the first inductor and the second inductor includes a line conductor pattern provided on the insulating substrate and connected to the antenna conductor pattern near a feed port of the antenna conductor pattern.

5. The high frequency circuit module according to claim 2, wherein
the antenna includes an antenna conductor pattern provided on an insulating substrate; and
at least one of the first inductor and the second inductor includes a line conductor pattern provided on the insulating substrate and connected to the antenna conductor pattern near a feed port of the antenna conductor pattern.

6. The high frequency circuit module according to claim 1, wherein
the switch is configured to select the connection of the second inductor between the antenna port and the ground; and
a parallel circuit of the second inductor and the switch is connected in series to the first inductor.

7. The high frequency circuit module according to claim 6, further comprising a plurality of the parallel circuits of the second inductor and the switch.

8. The high frequency circuit module according to claim 7, wherein the plurality of the parallel circuits includes a parallel circuit of a first pair of the second inductor and the switch and a parallel circuit of a second pair of the second inductor and the switch, and is configured so that a series circuit of the parallel circuit of the first pair and the second inductor of the second pair is connected in parallel to the switch of the second pair.

9. The high frequency circuit module according to claim 7, wherein
the antenna includes an antenna conductor pattern provided on an insulating substrate; and
at least one of the first inductor and the second inductor includes a line conductor pattern provided on the insulating substrate and connected to the antenna conductor pattern near a feed port of the antenna conductor pattern.

10. The high frequency circuit module according to claim 6, wherein
the antenna includes an antenna conductor pattern provided on an insulating substrate; and
at least one of the first inductor and the second inductor includes a line conductor pattern provided on the insulating substrate and connected to the antenna conductor pattern near a feed port of the antenna conductor pattern.

11. The high frequency circuit module according to claim 1, wherein
the reactance circuit portion includes at least three reactance devices including the at least one variable reactance device;
the at least one variable reactance device is a first reactance device that is connected between the antenna port and the front-end port;
a second reactance device is connected between the ground and the first reactance device at an antenna port side thereof; and
a third reactance device is connected between the ground and the first reactance device at a front-end port side thereof.

12. The high frequency circuit module according to claim 11, wherein at least one of the second reactance device and the third reactance device is a variable reactance device.

13. The high frequency circuit module according to claim wherein
the reactance circuit portion, the first inductor, and the switch are formed or mounted on a circuit substrate; and
a mounting land for the second inductor is provided on the circuit substrate, and the second inductor is mounted on the mounting land.

14. The high frequency circuit module according to claim 1, wherein
the switch is configured to select the connection of the second inductor between the antenna port and the ground; and
the second inductor and the switch are connected in parallel to define a parallel circuit connected to the antenna port and the first inductor.

15. The high frequency circuit module according to claim 1, wherein the switch is a first switch and the variable inductor circuit portion further includes a second inductor, a third inductor, and a second switch.

16. The high frequency circuit module according to claim 15, wherein
the first inductor has a fixed inductance and is connected between the antenna port and the ground; and
each of the second inductor and the third inductor has a fixed inductance and is connected between the antenna port and the ground, a connection of which is to be selected.

17. The high frequency circuit module according to claim 15, wherein the first inductor is connected between the antenna port and ground, the second inductor and the first switch are connected in series to define a series circuit connected in parallel to the first inductor, the third inductor and the second switch are connected in series to define a series circuit connected in parallel to the first inductor.

18. The high frequency circuit module according to claim 15, wherein the first inductor is connected between the antenna port and ground, the second inductor and the first switch are connected in parallel to define a parallel circuit connected to the antenna port and the first inductor, the third inductor is connected between the parallel circuit and the first inductor, and the second switch is connected in parallel to a series circuit of the parallel circuit and the third inductor.

* * * * *